United States Patent
Rein et al.

(10) Patent No.: US 10,726,214 B2
(45) Date of Patent: Jul. 28, 2020

(54) INTEGRATED STATIONARY RFID READER

(71) Applicant: Brady Worldwide, Inc., Milwaukee, WI (US)

(72) Inventors: Alex C. Rein, Milwaukee, WI (US); Gregg J. Haensgen, Menomonee Falls, WI (US); Jeffrey C. Krueger, Oconomowoc, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 16/491,934

(22) PCT Filed: Mar. 8, 2018

(86) PCT No.: PCT/US2018/021482
§ 371 (c)(1),
(2) Date: Sep. 6, 2019

(87) PCT Pub. No.: WO2018/165386
PCT Pub. Date: Sep. 13, 2018

(65) Prior Publication Data
US 2020/0074125 A1    Mar. 5, 2020

Related U.S. Application Data

(60) Provisional application No. 62/469,259, filed on Mar. 9, 2017.

(51) Int. Cl.
*G06K 7/00* (2006.01)
*G06K 7/10* (2006.01)
(Continued)

(52) U.S. Cl.
CPC ....... *G06K 7/0008* (2013.01); *G06K 7/10366* (2013.01); *G06K 19/0723* (2013.01); *G06Q 10/087* (2013.01)

(58) Field of Classification Search
CPC .............. G06K 17/00; G06K 7/10366; G06K 2017/007; H04B 17/318
(Continued)

(56) References Cited

U.S. PATENT DOCUMENTS 7,148,803 B2 * 12/2006 Bandy .................... G08B 25/10
                                                    340/539.16
7,365,645 B2 *  4/2008 Heinze .................. G06K 17/00
                                                    340/572.1

(Continued)

OTHER PUBLICATIONS

PCT International Search Report and Written Opinion, PCT/US2018/012482, dated May 7, 2018, 13 pages.

*Primary Examiner* — Eric Blount
(74) *Attorney, Agent, or Firm* — Quarles & Brady LLP

(57) ABSTRACT

Systems and methods of the present invention provide for storing a unique identifier for an RFID tag associated with, and affixed to, an asset. An RFID reader, coupled to a server computer through a network, executes firmware instructions causing the reader to receive a transmission from a server computer to run a customizable software with programmable logic at the reader. The reader then recognizes the tag according to its signal strength, and determines a tag state for the tag according to a state machine in the customizable software. If the tag state changes, the reader publishes the tag state and transmits it to the server computer using a low bandwidth solution.

20 Claims, 12 Drawing Sheets

(51) Int. Cl.
*G06K 19/07* (2006.01)
*G06Q 10/08* (2012.01)

(58) Field of Classification Search
USPC .................................. 340/572.1–572.8, 10.1
See application file for complete search history.

(56) References Cited

U.S. PATENT DOCUMENTS

| | | | |
|---|---|---|---|
| 9,596,990 B2* | 3/2017 | Park | A61B 5/0205 |
| 10,489,741 B1* | 11/2019 | Nigro | G06K 7/10366 |
| 2012/0050046 A1 | 3/2012 | Satorius | |
| 2013/0321131 A1 | 12/2013 | Tucker et al. | |
| 2016/0267301 A1 | 9/2016 | Elizondo, II | |

* cited by examiner

DETECTION OF UNIQUE TAG ID DURING INVENTORY CYCLES
X = Detection of Tag by Reader
----- = Standard Deviation DETECTION OF UNIQUE TAG ID DURING INVENTORY CYCLES
X = Detection of Tag by Reader
----- = Standard Deviation File Edit Tools System Level Software Custom Reader Software Control Panel for User

Programmable Profile:

Tag Unique ID: ABC123   Asset: BlueCart1

Parameters:

Entered Wait cycles: 5   Left Count cycles: 5   Moving Wait cycles: 5

Threshold average data points outside standard deviation: 2

Actions to be taken when Tag ID enters reader field:   LED Lights ▽
Audio Alert
LED and Audio
None

FIG. 6

```
File  Edit  Tools           ⇐ ⇒

Acme Hospital Dashboard for User

Find Asset:                                      Most Active:    Least Active

[            ]  [ Find ]                         BlueCart1       Asset2
                                                 iPhone1412      Asset3
Asset:              Last Seen:                   Laptop154       BuildingAsset
                                                 Laptop154       BuildingAsset Assets Checked Out:                              Favorite Assets:

[            ]  [ Find ]

Asset:          Checked Out:      Expected Back:

BlueCart1       2/24/2017
iPhone1412      2/24/2017
PoleHigh        2/17/2017
```

FIG. 7

INTEGRATED STATIONARY RFID READER

CROSS REFERENCE TO RELATED APPLICATIONS

This application represents the national stage entry of International Application No. PCT/US2018/021482 filed Mar. 8, 2018, and is based on, claims priority to, and incorporates herein by reference in its entirety for all purposes, U.S. Provisional Application No. 62/469,259 filed Mar. 9, 2017 and entitled "INTEGRATED STATIONARY RFID READER."

FIELD OF THE INVENTION

This invention relates to Radio Frequency Identification (RFID) tags and readers, and specifically to readers including embedded programmable firmware which identifies all readable tags, identifies a tag state for each tag, and transmits, via a publish/subscribe-based messaging protocol, only tag state changes to a server, thereby providing for a low bandwidth, 2-way, cloud enabled communication between the reader and the server for purposes of asset identification, location, and tracking.

SUMMARY OF THE INVENTION

The present invention provides systems and methods comprising one or more server computers communicatively coupled to a network and configured to: store a unique identifier for an RFID tag associated with, and affixed to, an asset. An RFID reader, coupled to a server computer through a network, executes firmware instructions causing the reader to receive a transmission from a server computer to run a customizable software with programmable logic at the reader. The reader then recognizes the tag according to its signal strength, and determines a tag state for the tag according to a state machine in the customizable software. If the tag state changes, the reader publishes the tag state and transmits it to the server computer using a low bandwidth solution.

The above features and advantages of the present invention will be better understood from the following detailed description taken in conjunction with the accompanying drawings.

BRIEF DESCRIPTION OF THE DRAWINGS

FIG. 6 is an example embodiment of a user interface used in the integrated RFID system.

FIG. 7 is an example embodiment of a user interface used in the integrated RFID system.

DETAILED DESCRIPTION

Figure 1:
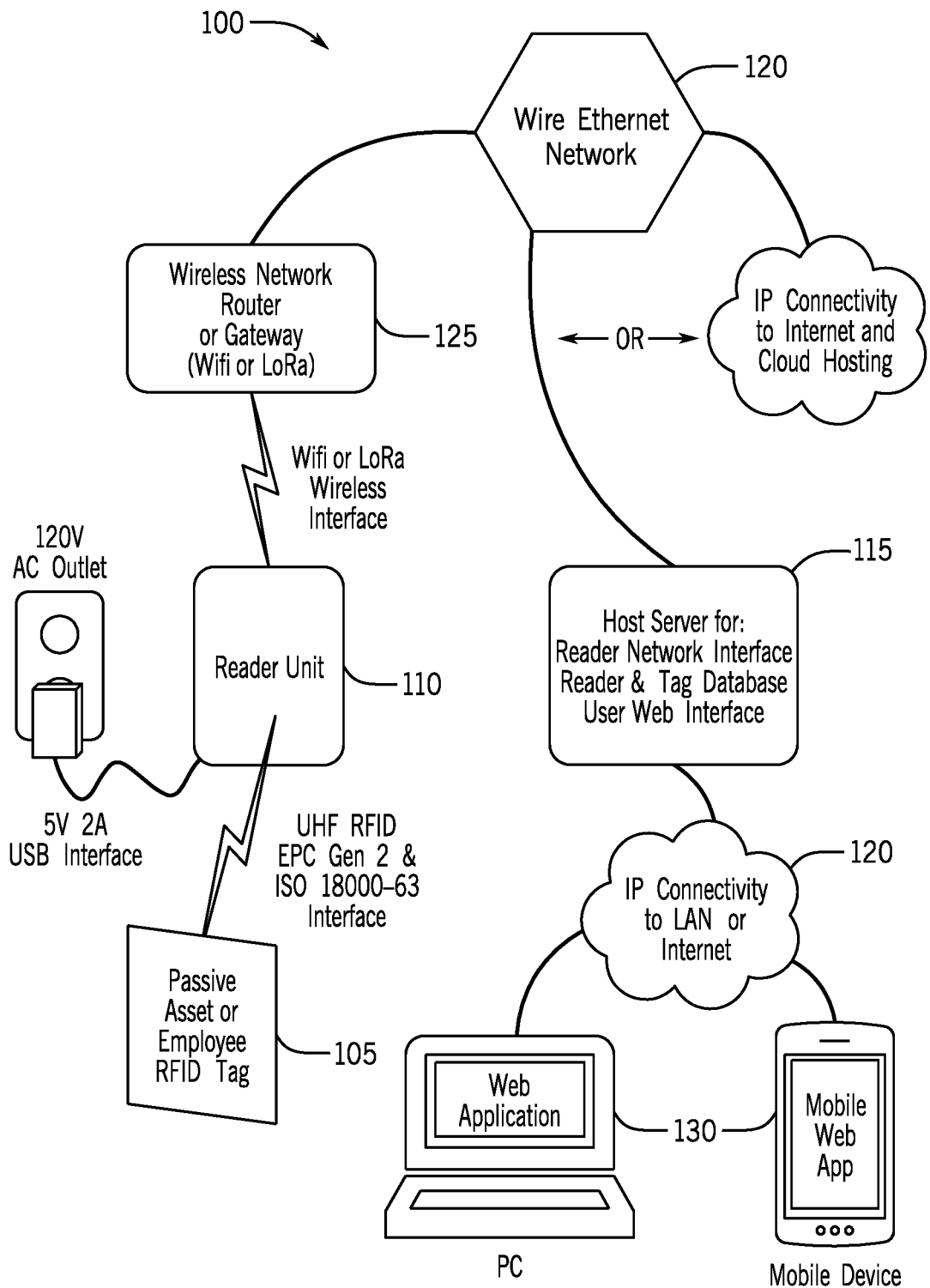
FIG. 1 illustrates system level block diagram for an integrated RFID system.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

RFID is a technology that uses integrated circuits to track items such as consumer commodities. RFID readers determine the presence of an active or passive RFID tag within the field of the reader, and are therefore used to locate and identify one or more RFID tags affixed to assets (including, for example, inventory or employees). A single reader may read, identify and locate thousands of tags in seconds. The data read from the reader may be communicated (e.g., through a local network) to a proprietary software running on a dedicated server, which processes the received data. This processed data may be used for asset tracking, inventory and management in retail and supply-chain/logistics environments, for example.

Traditionally, installation of RFID readers has been an expensive and labor-intensive process, requiring substantial technical knowledge to configure and mount the RFID reader unit itself to a permanent location. Installation also requires the set up and configuration of additional hardware and software, such as an external antenna, a connection of the external antenna to the RFID reader unit via a coaxial cable, an independent power source, a server computer running customizable software specific to each deployment and facility and accessible to the RFID reader unit via a local network, a network cable configuration required to connect the RFID reader to the server through the local network, etc. Because of the expense and technical knowledge required for installation of an RFID reader environment, many users have chosen not to utilize RFID as an asset tracking and management solution.

Thus, there is a need for a self-contained, simple-to-deploy reader, which is lightweight, contains an internal antenna, and is not limited to a local network environment requiring a connection via a network cable.

As noted above, traditional RFID readers can locate thousands of tags in a matter of seconds. Traditionally, these readers have been incapable of processing the received data, but instead, merely read the data from all tags within the reader's field at a given point in time, and stream the data from all identified tags at, as many as hundreds a second, through the local network for processing by the customizable software running on the server. This traditional model generates a large amount of network traffic, which in turn requires a high-bandwidth (e.g., wired network) environment, and prevents users from utilizing an environment optimized for low bandwidth environment (e.g., a cloud-based network accessible via Wi-Fi).

Thus, there is a need for an environment in which RFID readers are deployed in a large scale fashion, while at the same time, maintaining a low data/bandwidth and cloud-based environment.

Traditional RFID readers have also not functioned as two-way communication devices. The RFID readers only pass along information to an application server, where server-based rules engines make sense of the tag data collected by the reader. For example, if an RFID tag is presented to a traditional reader, the tag identification number is communicated back to a server where it is processed. However, traditional readers lack the ability to perform independent actions related to the received tags.

Thus, there is a need for readers capable of being programmed to perform customized independent actions, and to both communicate with, and receive communications from, additional devices.

The disclosed invention provides an easy-to-install integrated RFID reader to be used as a standalone asset location device, or to be installed as part of a system of deployed readers. The reader may track and locate assets without having to invest in the infrastructure and labor associated with traditional RFID reader systems.

An asset within this system may be assigned a unique RFID tag. The tag may be registered within software or a database as being associated with the asset. An integrated antenna within each reader may notify the reader (and, in turn, one or more servers) when a passive (or in some embodiments, active) tag enters and leaves the reader's field.

In some embodiments, the disclosed system may store approved tag data in association with the unique RFID tag of each of one or more RFID tags that specifically associate the RFID tag with the disclosed system.

The disclosed RFID reader includes an internal database. The database may store the unique identifier (id) of one or more RFID tags that enter the RFID reader's field, and possibly the asset that the RFID tag identities.

The disclosed RFID reader may also include an embedded and integrated firmware and/or software (software). This embedded software may include programmable and configurable software logic, possibly a programmable and configurable rules engine. This programmable and configurable software logic may be configured to receive a notification that a tag has entered the field of range for the RFID reader, and store related data within the internal database. The software may process, within the reader itself, the received tag information to determine a current tag state for each tag, based on conditions met within the programmable and configurable logic, and, using a publish protocol, only transmit the tag states if the tag state for one or more identified tags changes. This halted messaging model allows for discrete and smaller messages to be sent upon different events occurring in the system.

One or more servers connected to the RFID reader may subscribe to the tag state change message(s) published by the RFID reader. Because the RFID reader is not passing along every bit of information it receives, bandwidth is significantly reduced compared to the current state-of-the-art RFID readers This low bandwidth model allows for high deployments of devices (e.g., 1 per room) while maintaining a low data streaming rate, low power consumption (e.g., 5 Volts/2 Amp—the operating voltage provided by a Universal Serial Bus (USB) power interface), and a wireless connection model allowing the device to be operated as an Internet of Things (IoT) device.

Some embodiments may further reduce power consumption by utilizing a passive infrared (PIR) technology, wherein each RFID reader includes a motion sensor that, when triggered, activates the RFID reader that reads a tag associated with the asset that triggered the motion sensor.

The low bandwidth model also allows the reader to connect wirelessly via wireless communication, and to be deployed as a direct-to-cloud device, enabling remotely-hosted deployments, which in turn make RFID technology accessible to a broader group of consumers and applications, and allow for bi-directional two way communication between the reader device and an application server.

This remote deployment and two-way communication between the device and the server allows the server to administer, deploy, and install customizable software to be run on the device, which may be programmed to communicate meaningful information at the physical position of installation. This software may support configurable program logic, profiles and/or parameters that may program the device to determine hardware behavioral operation for common applications running on the device (e.g., asset tracking).

The programmable program logic, profiles and/or parameters may be input by a user via a server-generated and web-based interface, which may, for example, identify one or more tags and establish conditional logic related to the tag, including actions to be taken by the device when that particular tag is within its field. The server may receive the user input, and transmit it to the program. Once the programmable logic, profiles, and/or parameters are implemented within the device, the device may respond conditionally to specific tags that come within range of the device. For example, when the tag passes by the reader, the reader may determine the state of the tag (e.g., whether the tag is new, moving, settled, or left), and only transmit a message to the server if the state of any of the tags has changed.

As another brief illustration, the reader may include hardware for providing visual or audio feedback. The configurable logic, profiles and/or parameters may create audio and visual notifications integrated into the reader (e.g., audio alerts or LED signals), configured by a user, so that when the tag passes by the device, the device triggers illumination of a custom color LED, and/or a custom audio alert.

Turning now to FIG. 1, the disclosed system may utilize a Real-Time Locating System (RTLS) 100 to automatically identify and track the location of objects or people in real time, possibly within a building or other contained area. The RLTS 100 may include one or more wireless RFID and/or RTLS tags 105 (tags), which may be attached or affixed to objects, or may be worn by people.

These tags 105 may use any combination of passive or active RFID and/or RTLS. Active RFID/RTLS utilizes battery-powered beacons that continuously emit a signal, including a unique identifier for each tag 105. Passive RFID/RTLS uses no batteries, harvesting energy from an RFID reader to power and transmit its unique identifier and any additional data on the tag 105 to the RFID reader unit 110 (reader). In some disclosed embodiments, only passive RFID tags are used.

The RTLS 100 may further include one or more readers 110 installed and positioned within a designated location, such as a permanent or fixed position within a building or a contained area. Each reader 110 may be self-contained, including one or more fixed-position passive and/or active EPC Gen 2 (and ISO 18000-63) compliant RFID reader/writer configurations. Each reader 110 may be a standalone device, or may be one of several devices within the designated location, as part of an integrated system used to track and locate tagged assets according to the proximity of tags 105 to the nearest reader 110 within the RLTS 100, for example. Unlike the prior art, in which an external antenna is required, each reader 110 may be a lightweight unit including an internal antenna, providing for a simpler installation.

Each reader 110 may be configured to detect the presence of one or more tags 105 (and by extension its associated asset) within the reader's 110 field in order to track their presence. This detection may be responsive and/or according to each tag's 105 wireless signal and Received Signal Strength Indicator (RSSI) relative to the fixed reference point of the reader 110. The reader 110 may further determine the location of each tag 105 within its field. As non-limiting examples, the reader may be able to track automobiles through an assembly line, locate pallets of merchandise in a warehouse, find medical equipment or employees within a hospital, etc.

The reader 110 may further receive input from the tag 105 in the form of a unique identification for the tag 105, the RSSI for the tag 105, and any additional data stored on the tag 105. In some embodiments, the readers 110 may be configured for sensory data aggregation. For example, each reader 110 may have sensors that identify, in association with each unique tag id, temperatures associated with each unique tag id; extensive motion, such as would be experienced during an earthquake; etc.

Each reader 110 may include software embedded within the reader 110, running at the physical position of installation, and configured to communicate meaningful information both within and from the reader 110. The software may be customizable or configurable by implementing programmable logic, profiles and/or parameters that determine hardware behavioral operation for common applications such as asset tracking.

For example, each reader 110 may download and install the customizable software, as well as the programmable logic, profiles, and/or parameters from a central location (e.g., from an application server 115). As a tag 105 associated with a specific asset or person enters the reader's 110 field, the reader 110 may detect the presence of the tag 105, and store the tag within the reader's 110 internal database. The programmable logic, profiles, and/or parameters within the customized and configurable software may cause the reader 110 to respond conditionally to the identified tag 105.

In one non-limiting example embodiment, a host server 115 may push the customizable software, as well as the programmable logic, profiles, and/or parameters, to one or more readers 110, which may efficiently process and communicate tag state data for each tag 105 within the reader's 110 field. This tag state data may be calculated according to a tag state model defining a state machine and a rules engine in the customizable software. A non-limiting example tag state model is seen in FIG. 2A.

As seen in FIG. 6, the customizable software may further define a number of inventory cycles during which tags 105 within the reader's 110 field may be detected and identified, and that must complete before identifying a change in tag state. For example, in FIG. 3, a number of "entered wait" cycles may be required before tags in an Entered state transition to a Settled or Moving state. A number of "left count" cycles may be required before tags in an Entered tag state, a Moving tag state, or a Settled tag state transition to a Left state. A number of "moving wait" cycles may be required before tags in a Moving tag state transition to a Settled state. The programmable logic, profiles and/or parameters within the customizable software may also define a number, frequency, and duration of inventory cycles, which the reader 110 may adapt to account for the number of tags 105 present in the reader's 110 field. The reader 110 may therefore have no concept of absolute time.

During each inventory cycle (i.e., detection of all tags within the reader's 110 field), each reader within the RTLS 100 may detect all tags 105 within the reader's 110 field. The customizable software may update each tag's 105 tag state once per inventory cycle. Thus, the reader 110 may detect, determine and assign a "state" to each tag governed by the programmable logic, which determines how the tag may change states. As seen in the non-limiting examples seen in FIG. 2A, the programmable logic may define tag states including: an Entered state indicating that a new tag has been inventoried in the last cycle, a Settled state indicating that a tag is not moving, a Moving state indicating that a tag is not yet or is no longer in a Settled state, and a Left state, indicating that a tag is no longer inventoried within the reader's field.

Figure 2A:
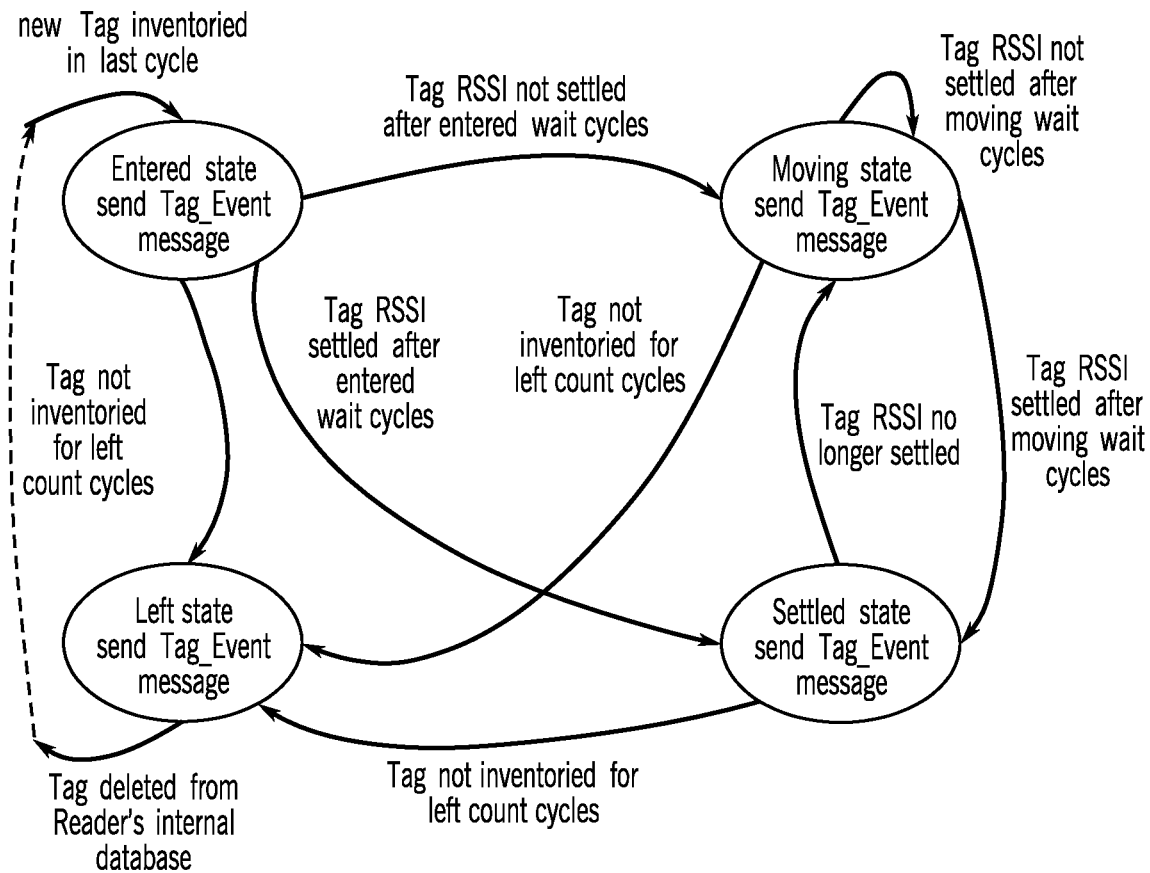
FIG. 2A illustrates a tag state model determining a state for each RFID tag within the integrated RFID system.

Thus, in FIG. 2A, a new tag 105 may be detected within the reader's 110 field during an inventory cycle. The identified tag may transition to an Entered state according to the programmable logic. Each reader 110 may maintain an internal database to track the state of each of the tags within the reader's 110 field. The tag's unique identifier may be added to the reader's 110 internal database in association with the Entered state, and the reader 110 may publish a Tag_Event message, as described below, indicating that the tag state has transitioned from non-existent to Entered.

If the reader does not detect the Entered tag for "left count" number of cycles, the Entered tag may transition to a Left state according to the programmable logic, may be deleted from the reader's 110 internal database, and the reader 110 may publish a Tag_Event message indicating that the tag state has transitioned from Entered to Left.

If the reader 110 continues to detect the Entered tag for "entered wait" number of cycles, the programmable logic may analyze the Entered tag's RSSI to determine whether the Entered tag is in a Settled or not in a Settled state. A tag 105 may be considered not settled within the reader's 110 field if there is a unit indication of a change in RSSI. Alternatively, if the tag 105 moves between antennas for embodiments including multiple readers 110, the tag may likewise be in a not settled state. In embodiments including only a single reader 110, the reader may detect rough proximity based on RSSI.

Thus, the programmable logic within each reader 110 may identify and transition between the tag states for each tag 105. For example, when a new tag 105 is detected during an inventory cycle, it may transition to an Entered state, as described above. If the identified tag 105 is not detected during "left count" cycles, it may transition to a Left state, as described above.

As seen in FIG. 6, the programmable logic may determine Settled or Moving states according to a sliding average of RSSI. The programmable logic may define a threshold to detect an average number cycles (e.g., moving wait cycles) in order to determine when a user should be notified of movement, to avoid false positives, for example. The logical rules may then analyze an average RSSI for the identified tag 105 over time (e.g., during "moving wait" inventory cycles) by determining the average number of RSSI data points within a standard deviation of samples, and the average number outside the standard deviation of samples.

If the average number of data points within the standard deviation is less than the threshold during a window including a specific number of inventory cycles, the programmable logic rules may determine that the asset associated with the tag 105 is in a Settled state. However, if the average number of data points outside the standard deviation is greater than the threshold for the same window, the programmable logic may determine that the asset associated with the tag 105 is in a Moving state. Alternatively, in embodiments including multiple readers, a shift in RSSI strength may indicate a Moving state.

The threshold may be programmable within the programmable logic. For example, for users whose assets are largely in storage rooms, the threshold may be greater, meaning the RSSI would be less sensitive in order to avoid false positives. By contrast, a user in a hospital may move (or move assets) between rooms more frequently, requiring a lower threshold, meaning that the RSSI would be more sensitive to distinguish between a Settled and Moving tag state.

Figure 3:
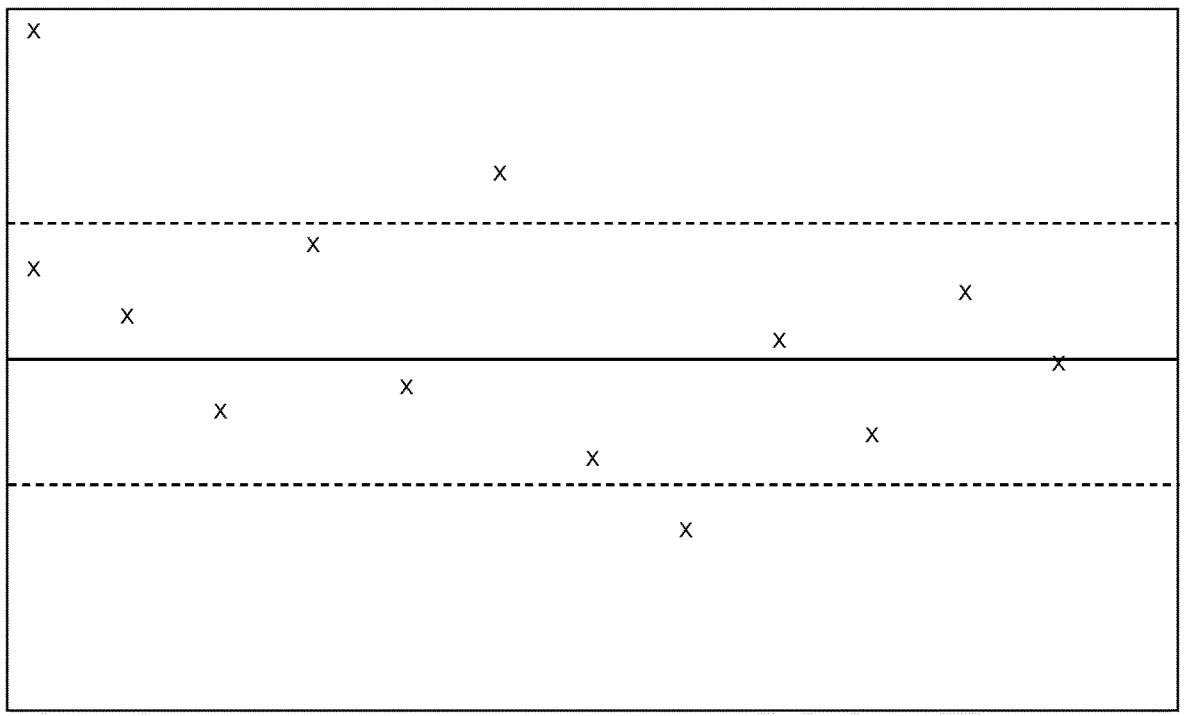
FIG. 3 illustrates a diagram representing a plurality of data points, within a defined threshold, which on average, are within a defined standard deviation.
Figure 4:
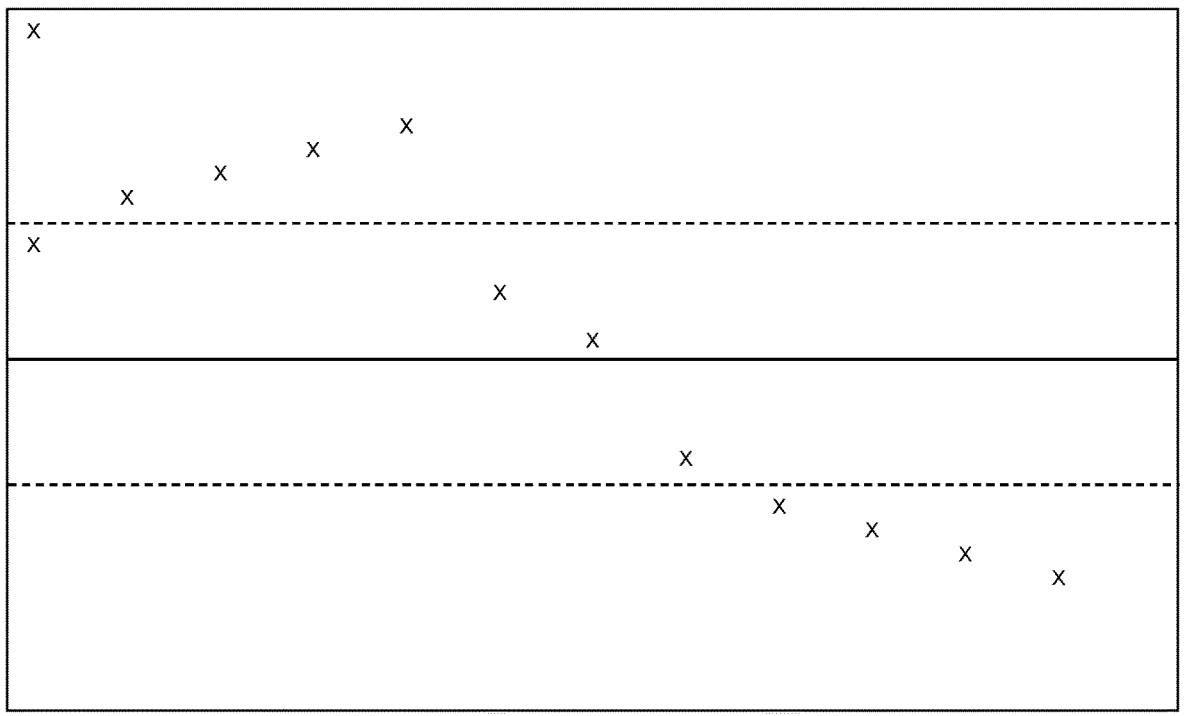
FIG. 4 illustrates a diagram representing a plurality of data points, within a defined threshold, which on average are outside of a defined standard deviation.

FIGS. 3-4 provide a graphical representation of the sliding averages of RSSI. In these illustrations, a reader may detect a specific unique tag id during a specific number of inventory cycles. The programmable logic, profiles, and parameters may define the number of inventory cycles, a standard deviation, and an average number of data points that fall within or outside of the standard deviation to transition the tag's 105 state from Settled to Moving.

Thus, in FIG. 3, if the average number of data points outside the standard deviation is defined as greater than 2 for a moving state, the unique tag id tracked in FIG. 3 would be determined to be in a Settled state. Likewise, in FIG. 4, if the average number of data points outside the standard deviation is defined as less than 9, the unique tag id tracked in FIG. 3 would be determined to be in a Moving state.

Returning to FIG. 2A, the programmable logic may determine that an Entered tag has an average number of RSSI readings outside the standard deviation threshold, and is therefore not settled, after "entered wait" number of inventory cycles. The Entered tag may transition to a Moving state according to the programmable logic, the tag's 105 unique identifier may be updated within the reader's 110 internal database in association with the Moving state, and the reader 110 may publish a Tag_Event message, as described below, indicating that the tag state has transitioned from Entered to Moving.

Alternatively, the programmable logic may determine that the Entered tag has an average number of RSSI readings within the standard deviation threshold, and is therefore settled, after "entered wait" number of inventory cycles. The Entered tag may transition to a Settled state according to the programmable logic, the tag's 105 unique identifier may be updated within the reader's 110 internal database in association with the Settled state, and the reader 110 may publish a Tag_Event message, as described below, indicating that the tag state has transitioned from Entered to Settled.

As seen in FIG. 3, the programmable logic may determine that the Moving tag has an average number of RSSI readings outside the standard deviation threshold, and is therefore not settled, after "moving wait" number of inventory cycles. The Moving tag may maintain a Moving state according to the programmable logic, meaning it maintains its Moving state within the reader's 110 internal database, and a Tag_Event message is sent to the application servers.

Alternatively, the programmable logic may also determine that the Moving tag has an average number of RSSI readings within the standard deviation threshold, and is therefore settled, after "moving wait" number of inventory cycles. The Moving tag may transition to a Settled state according to the programmable logic, the tag's 105 unique identifier may be updated within the reader's 110 internal database in association with the Settled state, and the reader 110 may publish a Tag_Event message, as described below, indicating that the tag state has transitioned from Moving to Settled.

If the reader 110 does not detect the Moving tag for "left count" number of cycles, the Moving tag may transition to a Left state according to the programmable logic, may be deleted from the reader's 110 internal database, and the reader 110 may publish a Tag_Event message indicating that the tag state has transitioned from Moving to Left.

As seen in FIG. 2A, the programmable logic may determine that a Settled tag is no longer settled, possibly by determining that the Settled tag has an average number of RSSI readings outside the standard deviation threshold. The Settled tag may transition to a Moving state, according to the programmable logic, the tag's 105 unique identifier may be updated within the reader's 110 internal database in association with the Moving state, and the reader 110 may publish a Tag_Event message, as described below, indicating that the tag state has transitioned from Settled to Moving.

If the reader 110 does not detect the Settled tag for "left count" number of cycles, the Settled tag may transition to a Left state according to the programmable logic, may be deleted from the reader's 110 internal database, and the reader 110 may publish a Tag_Event message indicating that the tag state has transitioned from Settled to Left.

Figure 2B:
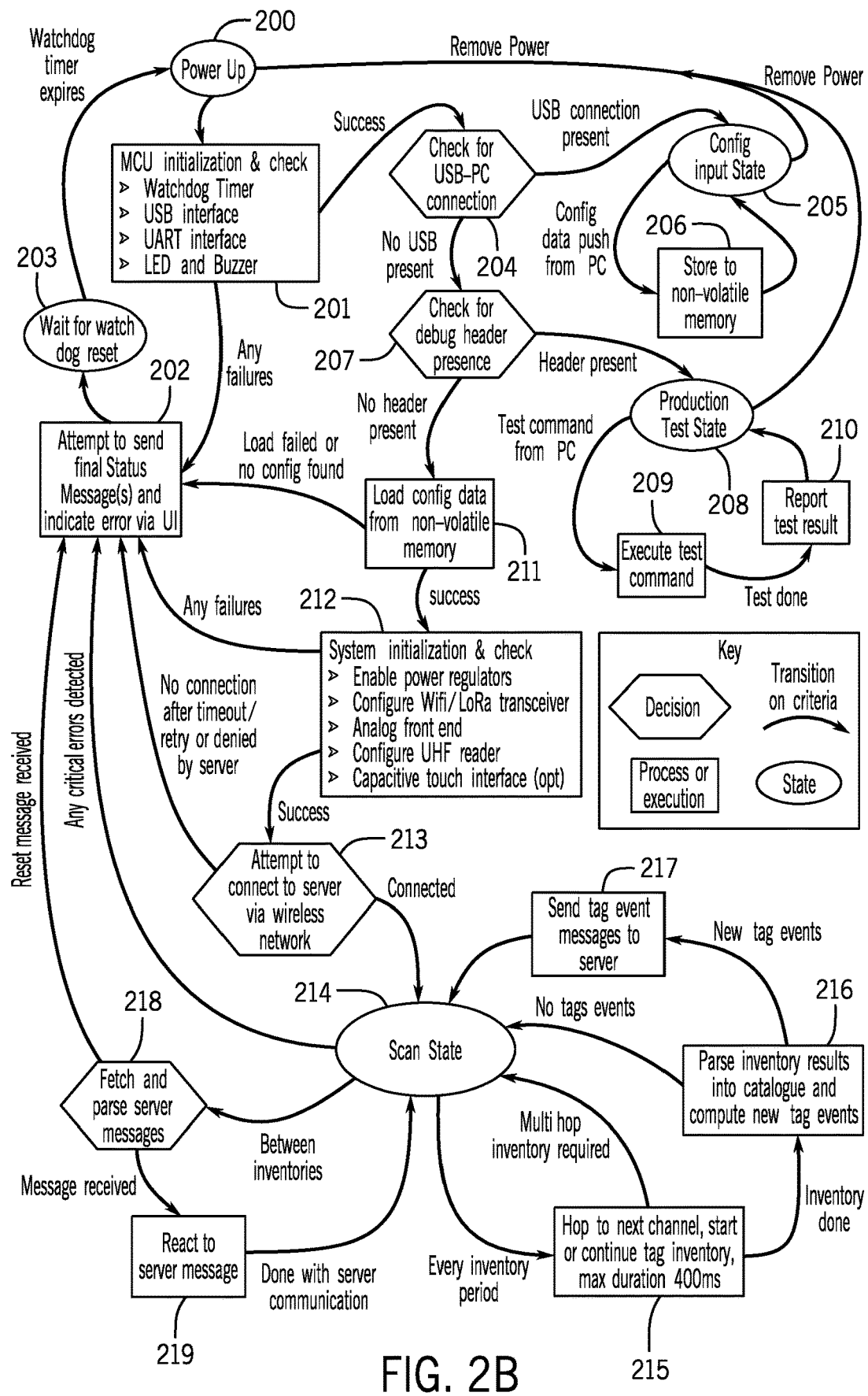
FIG. 2B illustrates a more detailed diagram of the integrated RFID system.

Turning now to FIG. 2B, a more detailed diagram of the disclosed system is provided. The system may power up at step 200. After powering up at step 200, the system may execute an MCU initialization and check at step 201, including a watchdog timer, a USB interface, a UART interface, and an LED and buzzer. If there are any failures, the system may attempt to send final status messages and indicate errors via one or more GUIs at step 202. At step 203, the system may then wait for the watchdog reset. If the watchdog timer expires, the system may return to the power up state at step 200.

If there is success in the power up steps described above, the system may check for a USB-PC connection at step 204. If a USB connection is present, the system may configure an input state at step 205. The system may receive a configuration data push from one or more computing devices, such as a PC, and store the data from the data push to a non-volatile memory at step 206. The system may then return to the configuration input state at step 205. If power is removed during the configuration input state, the system may return to a power up state at step 200.

If there is no USB present, at step 207 the system may check for the presence of a debug header. If the header is present, the system may move to a production test state at step 208. On a test command from a computing device such as a PC, the system may execute the test command at step 209, and once the test is done, may report the test result at step 210, and return to the production test state at step 208. If power is removed during the production test state, the system may return to a power up state at step 200.

If no header is present when the system checks for a debug header presence at step 207, the system may load configuration data from a non-volatile memory at step 211, and if the load fails or there is no configuration data found, the system may return to step 202 to attempt to send final status messages and indicate errors via one or more GUIs, then return to step 203 to wait for the watchdog to reset, and if it expires, return to step 200 to power up.

If the system successfully loads configuration data from a non-volatile memory at step 211, the system may run a system initialization and check at step 212, including: enabling power regulators; configuring WiFi and LoRa transceivers; an analog front end; configuring a UHF reader; and a capacitive touch interface.

If there are any failures in the system initialization and check at step 212, the system may return to step 202 to attempt to send final status messages and indicate errors via a GUI. The system may then wait for the watchdog to reset at step 203, and if the watchdog timer expires, return to the power up step at 200.

If the system initialization and check at step 212 is successful, the system may attempt to connect to the server 115 via a wireless network 125 at step 213. If there is no connection after a timeout/retry, or if the connection is denied by the server 115, the system may attempt to send a final status message and indicate an error via a GUI at step 202. The system may then wait for the watchdog reset at step 203, and if the watchdog timer expires, may return to the power up step at 200.

If the system successfully connects the server 115 via a wireless network 125, at step 214 the system enters a scan state. During every inventory period, at step 215 the system may hop to the next channel, and start or continue tag inventory at a maximum duration of 400 milliseconds. If a multi hop inventory is required, the system may return to the scan state at step 214.

If the inventory is done, at step 216 the system may parse the inventory results into a catalogue, and compute new tag events. If there are no tag events, the system may return to the scan state at step 214. If there are new tag events, at step 217, the system may send tag event messages to the server(s) 115, and return to the scan state at step 214.

If any critical errors are detected during the scan state at step 214, the system may return to step 202 to attempt to send final status messages and indicate errors via a GUI. The system may wait for a watchdog reset at step 203 and if the watchdog timer expires, return to the power up step at 200.

Between inventories during the scan state at step 214, the system may fetch and parse server messages at step 218. If a message is received, at step 219, the system may react to the server message, and once done with the server communication, may return to the scan state at step 214.

After fetching and parsing server messages at step 218, the system may reset the message received and return to step 202 to attempt to send final status messages and indicate errors via a GUI. The system may wait for a watchdog reset at step 203 and if the watchdog timer expires, return to the power up step at 200.

As noted above, as each reader 110 identifies state changes in the tags 105 within its field range. Based on the programmable logic in the software, in addition to storing data internally for each state change, the programmable logic may cause the reader 110 to publish the state changes as Tag_Event messages, transmitted to server(s) 115 that have subscribed to the published data using a publish/subscribe architecture model. In embodiments including more than one reader 110, RSSI data may also be transmitted to the server for the server to determine which reader 110 the tag 105 is in closest proximity to, and if it is moving to a closer proximity to a different reader 110.

Each reader 110 only publishes Tag_Event data if the RSSI data indicates a state change for at least one tag in the reader's range. Each reader 110 therefore applies programmable logic within the customizable software to limit the amount of data being transmitted over the network 120. Because the majority of tags are expected to remain stationary, without changing states for a large number of inventory cycles, the reader 110 may effectively act as a limiter on the amount of information transmitted back to the server(s) 115. This is in contrast to the current state of the art, wherein each reader 110 transmits every bit of information it receives. Each reader 110, therefore, is configured to process and communicate information in a way that significantly reduces the volume of data sent over the network, and in turn, the bandwidth required.

This environment and infrastructure shown in FIG. 1, which is optimized for a reduction in bandwidth, is advantageous, in that each reader 110 may be powered within a multi-reader environment, and may connect to a network 120 using low bandwidth solutions. This ability for each reader to connect using low bandwidth solutions, combined with each reader's 110 ability to run programmable logic, including configurable profiles and/or parameters, allows each reader to operate as an IoT device in a bi-directional, cloud-based environment.

Returning to FIG. 1, the optimized low bandwidth environment described above translates into low power consumption. For example, the readers 110 disclosed herein may be uniquely designed to be powered by 5 Volts/2 Amp, the operating voltage provided by a Universal Serial Bus (USB) power interface. Some embodiments may further reduce power consumption by utilizing a passive infrared (PIR) technology, wherein each reader 110 includes a motion sensor that, when triggered, activates the reader and causes the reader 110 to detect and read the tag 105 associated with the asset that triggered the motion sensor.

The disclosed low bandwidth and low power consumption environment may further be beneficial for a high-density environment. For example, an environment in which one reader 110 is installed in each room may be advantageous.

Returning to FIG. 1, the disclosed low bandwidth and low power consumption environment may also be optimized for transmitting the published message using lower bandwidth solutions. As non-limiting examples, each reader may transmit data to a wireless router 125, connected to an Ethernet network 120, via communication protocols such as MQTT, Wi-Fi, or LoRa.

MQTT is a lightweight messaging protocol for use on top of a TCP/IP protocol, as known in the art. This MQTT protocol may be used in IoT solutions to publish data for subscribing connected devices. WiFi may include technologies that allows electronic devices to connect to a wireless LAN (WLAN) network using the 2.4 gigahertz (12 cm) UHF and 5 gigahertz (6 cm) SHF ISM radio bands. LoRa may include a Low Power specification intended for wireless battery operated IoT devices in regional, national or global networks, providing secure bi-directional communication, mobility and localization services. BLE may include wireless personal area network technologies.

Returning to FIG. 1, the low bandwidth/low power consumption nature of each reader 110, combined with each reader's 110 configuration to run programmable logic, allows each reader to operate in a bi-directional, cloud-based environment. One or more system administrators or users may operate one or more server computing devices 115 in a data center. These server computing devices 115 may include, as non-limiting examples, one or more application servers, one or more hosting servers, etc. Each of these servers 115 may include at least one processor executing specific computer-executable instructions, such as server software, stored in a memory coupled to the server computing device(s).

The servers 115 may be connected to the Ethernet network 120. In some embodiments, the server(s) 115 may be operated at the same location as the readers 110, and may be directly connected, possibly via a local area network. In other embodiments, IP connectivity may be used, connecting the Ethernet network 120 and/or the server(s) 115 to the Internet, providing means for a cloud-hosting environment. Such an environment provides a bi-directional, direct-to-cloud communication between the readers 110 and one or more application and/or hosting servers 115.

Given this bi-directional, cloud based environment, each reader 110 may be deployed as a direct-to-cloud IoT device. In other words, the deployment of multiple readers 110 in a cloud-based environment provides for an internetworking of physical devices, connected devices, and/or smart devices at the network level. Each of these devices may be embedded with electronics, software, sensors, actuators, and network connectivity, either among each of these components or with connected servers 115, which enable the devices and their embedded software to collect and exchange data.

Returning to FIG. 1, the server(s) 115 may include components and data processing capabilities used to host and run software applications that allow for bi-directional communication between each reader 110 and the server(s) 115. For example, the server(s) 115 may host the customizable software that is deployed to, and installed on, each of the readers 110. The server(s) 115 may also run the software and protocols used to subscribe the Tag_Event messages published by each of the connected readers 110. Based on the programmable logic, the reader 110 may publish and transmit Tag_Event messages when certain conditions have been met (e.g., a state has changed for a tag 105), and the server(s) 115 may receive and process the published message, in order to locate and track tag 105 data.

In addition to receiving and processing the published Tag_Event messages, the server(s) 115 may store the data from the Tag_Event messages in a database coupled, possibly through the network 120, to the server(s) 115. The database may store, as non-limiting examples, any combination of unique identifiers for each of the tags 105, an asset or employee associated in the database with the unique identifier, configuration data for each of the readers 110, programmable logic, profiles and/or parameters for the customizable software installed on each of the readers 110, location data associated with each of the tags 105, etc.

In some embodiments, the database may store additional data associated with each of the tags 105, indicating that each associated tag is approved for use in the disclosed system. In some embodiments, this data regarding the tags 105 may be transmitted for storage within each reader's 110 internal database. Each reader 110 that detects each tag 105 may determine whether the tag 105 is associated with the system or organization. If so, the reader may proceed as disclosed herein. However, if the reader 110 detects a tag 105 that is not associated with the system or organization, it may respond according to the customizable software. For example, if a tag 105 is not associated with the system or organization, the programmable logic, profiles, and/or parameters may cause the reader 110 to ignore the tag 105, lock out the tag 105, and/or trigger a visual or audio alert, as described below.

Specifically, the programmable logic, profiles, and/or parameters within the customizable software may be configured to cause each reader 110 associated with a specific organization to lock out tags 105 that are not associated with the specific organization in the database or internal database on the reader 110. This is intended to prevent counterfeit or non-approved tags from being used within the system.

Figure 9:
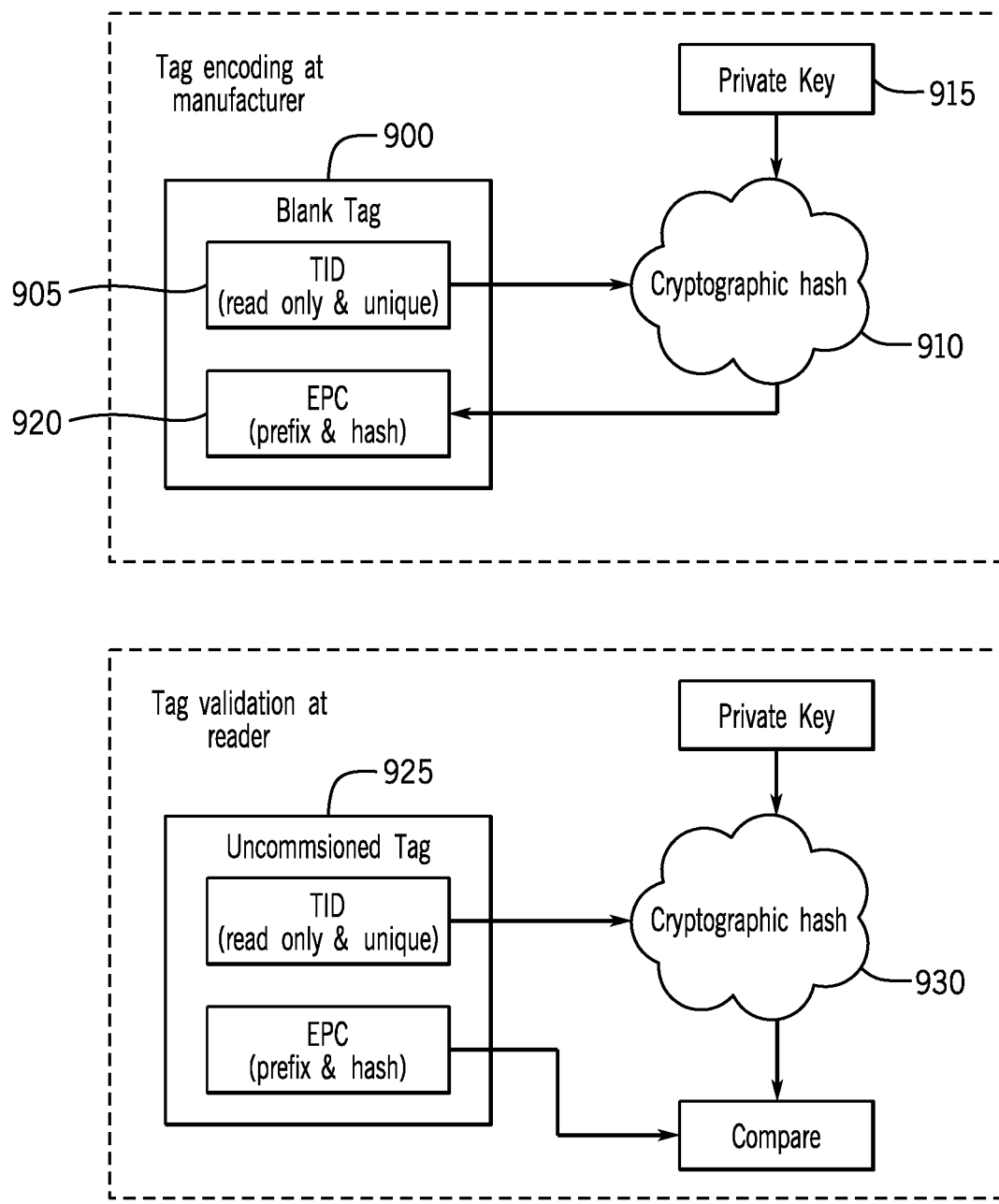
FIG. 9 illustrates a diagram of a tag specifically encoded to an organization within the integrated RFID system.

As seen in FIG. 9, the tags 105 may be provided to the organization as blank tags 900, each tag including a read only and unique id 905 (TID in FIG. 9). The tag may be read only in that the read only and unique id 905 cannot be changed for any of the tags 105. The unique id 905 may be unique among all tags 105 available, and may include a number identifying the tag type, the organization, and a unique serial number. Each tag 105 may be processed by an approved organization to encode each tag 105 with unique information which authenticates them to the readers 110.

The organization may process the tag by reading the read-only and unique id 905 from the tag 105. The organization may feed the TID into a cryptographic one way hash algorithm 910 using one of several private keys 915 known only to the organization. The resulting hash value is then written into a portion of the readable/writeable EPC memory 920 of the tag, thereby authenticating the tag's unique id as having been processed by the organization.

The system may designate one or more readers 110 as a commissioning reader. The commissioning reader may use the private key 915 to computer a secure hash value of the TID 905. The commissioning reader may detect and identify tags with a specific EPC 920 prefix identifying the tag 105 as un-commissioned. The remainder of the tag's EPC 920 may contain the hash value 910 computed above. The commissioning reader may read the un-commissioned tag's 925 read only and unique id 905. The commissioning reader may compare the computed hash value 930 to the stored hash 910 in the EPC 920. If hashes match, the un-commissioned tag 925 is known to be valid and the server 115 is notified that an un-commissioned tag 925 is present and ready to be assigned to an asset. However, if the computed hash value 930 does not match the stored hash 910 in the EPC 920, the un-commissioned tag 925 is invalid, and the reader 110 ignores it without assigning it to an asset.

When the un-commissioned tag 925 is assigned to an asset, a commission mode reader overwrites the EPC 920 with an EPC 920 specific to the asset's associated site. The TID 905 of the tag 925 with the new EPC tag is stored in a database to allow the tag 925 to be de-commissioned then re-commissioned to a different asset in the future. The EPC 920 is locked, and a write password is set using a portion of the secure hash value 910/930 to prevent the tag 925 from being altered.

The two-way communication between each reader 110 and the server(s) 115 provides an environment for users to customize the programmable logic, profiles, and/or parameters that determine behavioral operation for hardware such as the readers 110. Users may define the programmable logic, profiles and parameters within the customizable software running on the readers 110, according to the user's desires, in order to more efficiently track assets or employees. To accomplish this, server(s) 115 may host a system level software for rendering, transmitting, and/or receiving data from one or more Graphical User Interfaces (GUI). These GUIs may receive user input to establish, maintain, or update the programmable logic, profiles and/or parameters within the customizable software on each reader 110.

For example, a first GUI generated by the server(s), possibly after authentication of users, 115 may include a control panel, possibly available to users after authentication, including one or more GUI controls (textboxes, text areas, dropdown menus, checkboxes, radio buttons, sliders, links, etc.) for receiving user input identifying a unique identifier for each tag 105, and its associated asset or employee. Another example GUI generated by the server(s) 115 may include a control panel including one or more GUI controls for receiving user input for the customizing the programmable logic, profiles, and/or parameters for the customizable software running on each reader 110. FIG. 6 is a non-limiting example GUI incorporating this functionality.

A user may operate one or more client computing devices 130, such as a desktop or laptop computer, or a mobile computing device such as a phone or tablet, running client software. Each of these client computing devices 130 may include at least one processor executing specific computer-executable instructions (i.e., the running software) stored in a memory coupled to the client computing device.

The user may access and run a client-based software such as a web browser or web application, in order to request access to the system level software and/or the GUI (e.g., by entering a Uniform Resource Locator (URL) for a web page including the GUI). This request may identify the IP address for the server(s) 115, as well as instructions to generate and render the GUI and/or web page for the system level software. The server(s) 115 may execute one or more software instructions to generate and render the GUI, and transmit it to the client computing device 130 for display.

Using the first GUI described above, the user may input tag 105 data including unique identifiers for tags 105 and the associated asset or employee. The server(s) 115 may receive the user input data from the GUI, and store the user input data (e.g., each unique tag identifier and its associated asset or employee) within the database.

Using the second GUI described above, the user may input hardware behavioral operation data for the customizable software running on each of the readers 110. For example, the user may access the second GUI, and, because the logic for the embedded software is programmable, the user may update the tag state model to be applied to each tag 105 that is present in the reader's 110 field range.

In the non-limiting example embodiment seen in FIG. 2A, the bold text in the figure identifies those parameters which are programmable by the user. For example, the user may access a GUI such as that seen in FIG. 6 to update the tag states, the number of inventory count cycles, the averages and standard deviations to determine if a tag is Settled or Moving, etc. The server(s) 115 may receive the hardware behavioral operation configuration data from the GUI, and store it in the database.

The server(s) 115 may transmit these parameters to the embedded software running on the readers 110, which may update and implement the parameters within the embedded software (e.g., within each reader 110). The user may input data into the GUIs to update those parameters.

As noted above, the environment shown in FIG. 1 is optimized with components and data processing capabilities for bi-directional communication between the customizable software running on each reader 110 and the server(s) 115. Given this bi-directional communication, the system level software may include one or more GUIs configured to receive user input for programmable logic to be run on each reader 110. The programmable logic, which may be customized depending on the application, may provide for the reader 110 to execute certain actions in response to certain conditional logic. Specifically, within the programmable logic, the user may flag a unique identifier for a certain tag 105, and establish some conditional logic related to the tag.

Figure 5:
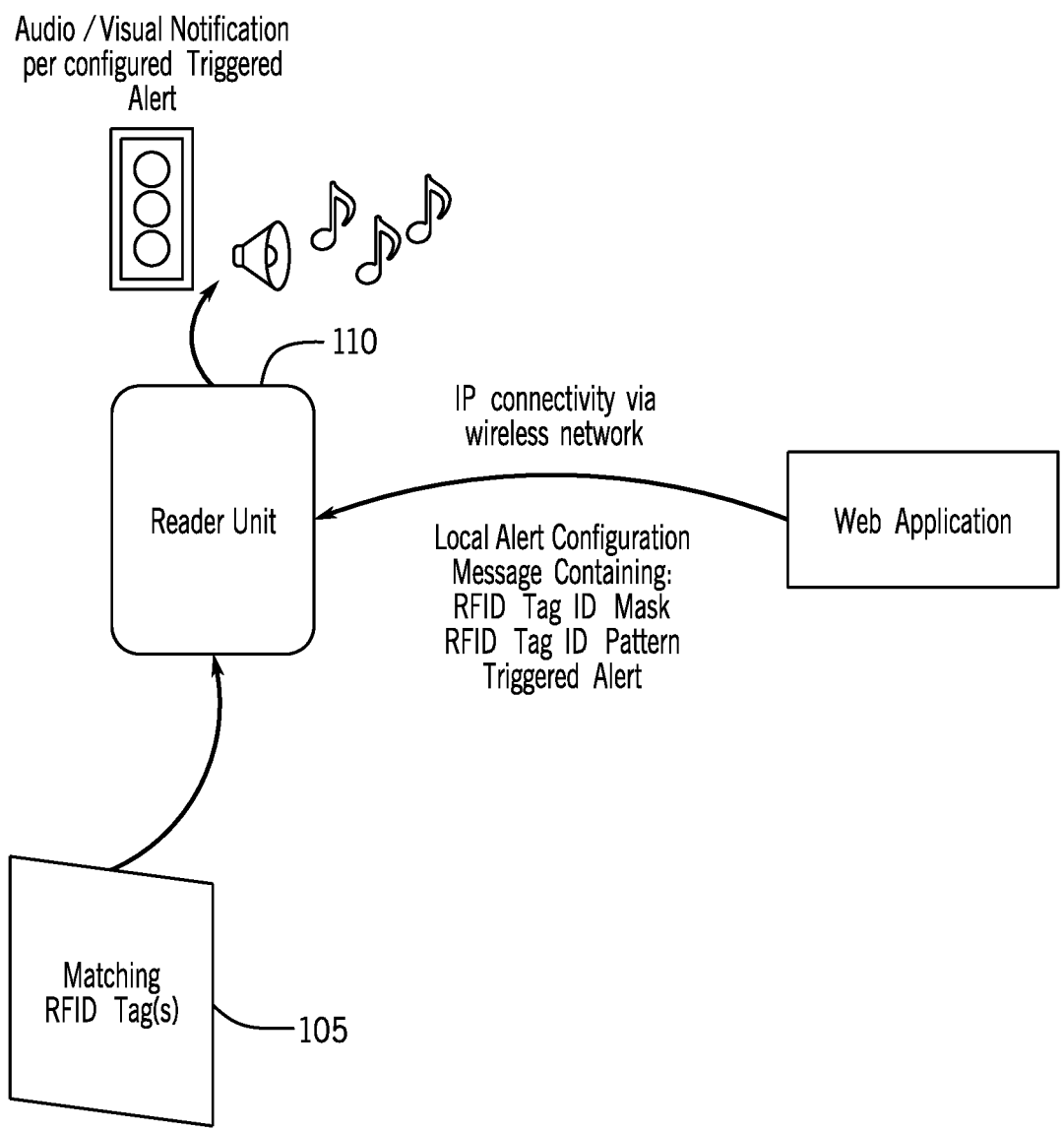
FIG. 5 illustrates a diagram of a local alert system within the integrated RFID system.

Turning now to the non-limiting examples seen in FIG. 5, each reader may include Light Emitting Diode (LED) indicator lights, and/or an audio hardware system (e.g., audio software and one or more speakers) configured to play audio files. The disclosed system may therefore may be configured (possibly using a GUI such as that seen in FIG. 6) to generate configurable field alerts by means of Audio/Visual notifications integrated into the reader 110.

In this example, the user may desire to have the LED lights and/or an audio sound file trigger when a specific tag 105 is read by the reader 110. The user may therefore access the GUI, which may include logic for audio and visual field notifications to be configured by a user for custom applications to offer configurable field alerts by means of LED and Audio alerts integrated into the reader 110. The user may input into the GUI a unique id for the tag 105, and provide programmable logic for the reader to create a visual or audio alert when the tag 105 associated with the unique identifier is read by the reader 110. Thus, when the tag 105 passes by the reader 110, the reader 110 takes the programmed action, the illumination of a custom color LED, and/or custom audio alert in this example.

The system level software may also include one or more GUIs, such as that seen in the non-limiting example GUI seen in FIG. 7, providing each user complete visibility into the current status of all assets. For example, a user may access a GUI reporting services within the system level software configured to quickly locate assets (e.g., equipment, inventory, employees, etc.) in a complex environment based on a high density deployment of the readers 110 within, for example, a building. The GUI may provide reader-generated data (e.g., information reported by each reader) and reports regarding: the current status/state of each asset; whether a particular asset is currently in range (possibly indicated by a visual cue such as a green icon), Settled, Moving, or Left/out of range (possibly indicated by a gray icon); a history of each asset; where each asset was last seen by readers 110; a list of currently checked-out assets, who they are currently checked out to, and when each is expected to return; which assets are most active or least active; which assets are the most frequently used; etc.

In the case of currently checked out assets, the alert to locate the assets when within range may be set to provide the LED and/or audio alerts disclosed above, as well as sending emails, texts, mobile app alerts, etc. to the appropriate administrators. Alternatively, a user could respond to the LED and/or audio alerts by logging in to the system level software and identifying the asset that triggered the alert.

Figure 8:
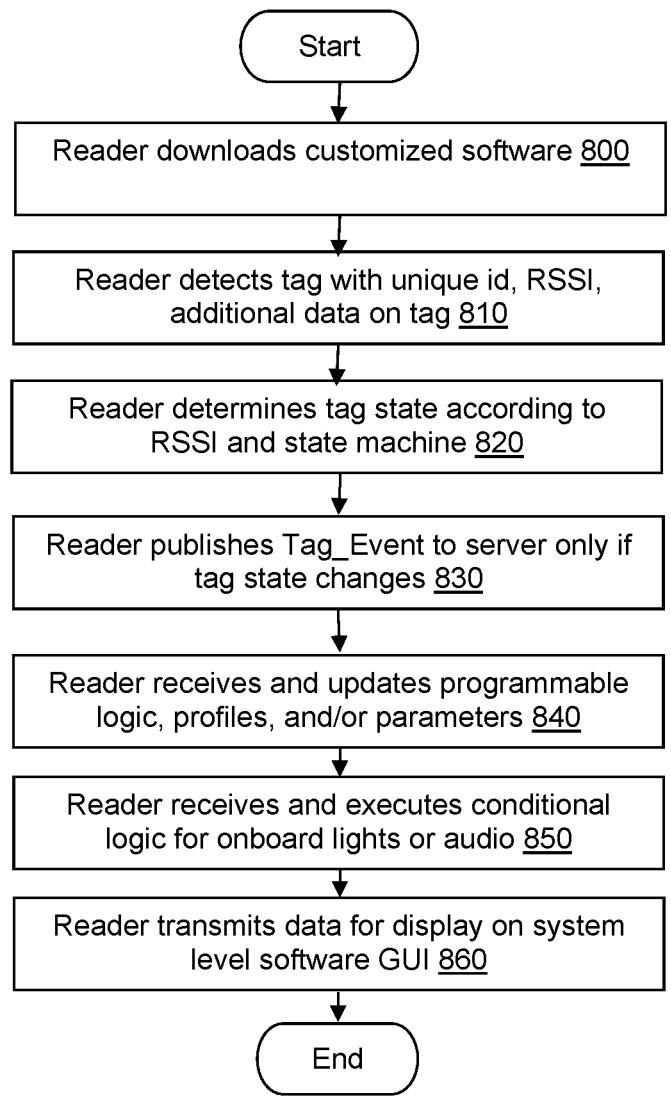
FIG. 8 illustrates a flow diagram for configuring and operating an RFID reader within the integrated RFID system.

Turning now to FIG. 8, a series of method steps is represented. In step 800, the reader 110 downloads the customized software, possibly including the programmable logic, profiles, and/or parameters. In step 810, the reader 110 detects one or more tags 105, each associated with a unique id and/or asset. In step 820, the reader 110 determines the tag state for each tag 105 within the field of the reader, according to the RSSI of each tag and the state machine within the customizable software and/or programmable logic, profiles, and/or parameters. In step 830, if the tag state of any of the detected tags 105 changes (and only if a tag state changes), the reader 110 publishes a Tag_Event for each tag 105 whose tag state changes. In step 840, the reader 110 may receive and update the programmable logic, profiles, and/or parameters, according to user input from the system level software. In step 850, if the user input includes instructions for conditional logic to be executed on the reader 110 and involving additional visual or audio hardware, the reader 110 may execute the conditional logic. In step 860, the reader 110 transmits data for display on the system level software GUI, so that the users may track the assets to which the tags 105 are affixed.

Figure 10:
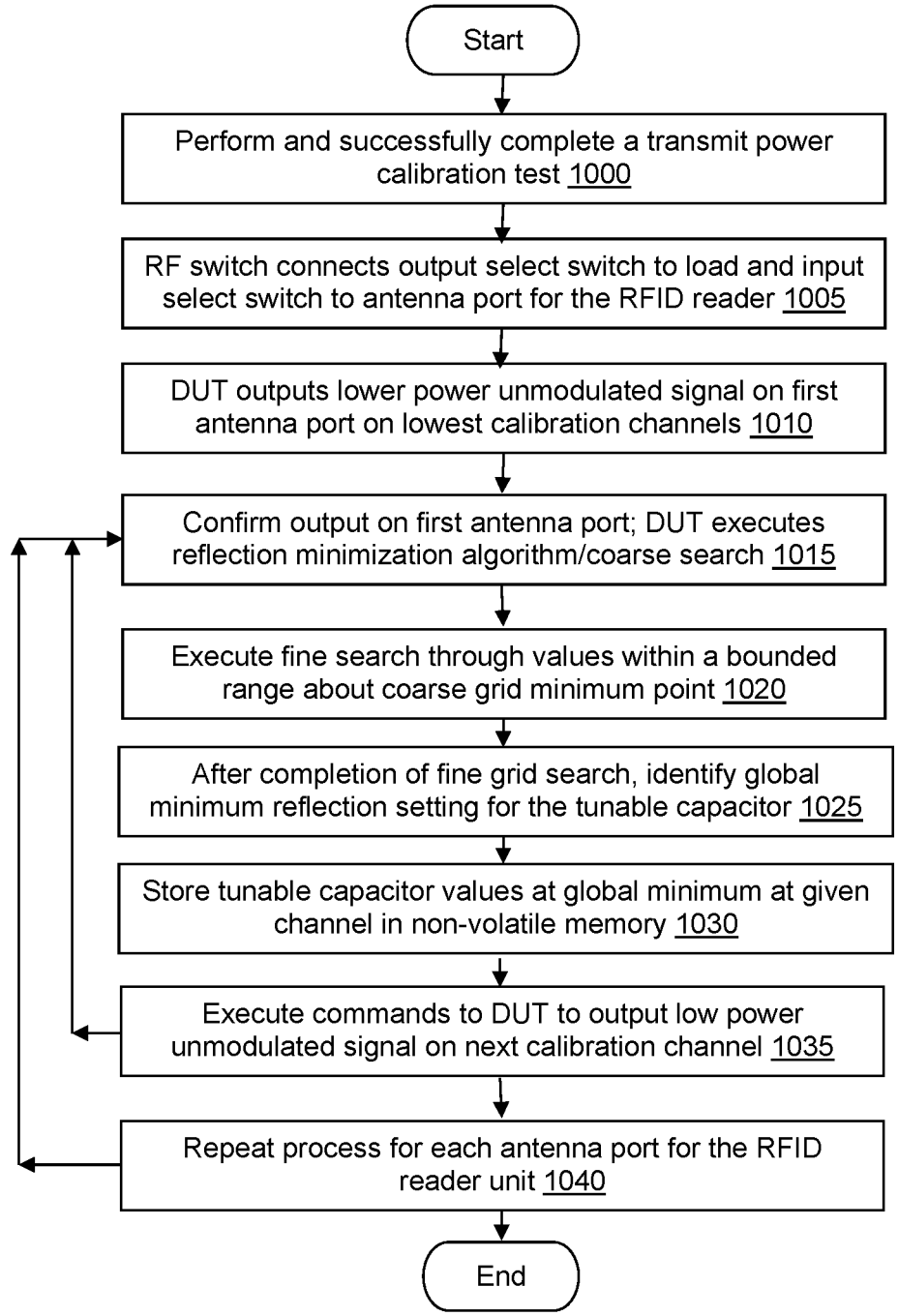
FIG. 10 illustrates a flow diagram for calibrating antenna ports during a production test within an RFID reader within the integrated RFID system.

FIG. 10 includes a flow diagram for the method steps in a production and calibration test for the RFID reader, as disclosed below. Within the disclosed embodiments, the RFID reader unit 110 may include one or more unique features configured to simplify installation and identify antenna connection issues. As noted above, these features may include the reader unit hardware, reader unit firmware, and the production test fixture which calibrates the reader's RF characteristics.

Prior to shipment and installation, each RFID reader unit 110 may be subjected to a production and calibration test. This testing may include calibration of the RFID reader unit's 110 antenna reflection cancelation circuit to a nominal setting simulating the device being connected to an ideal antenna (i.e. a 50 Ohm load). The production and calibration test may proceed as follows: In step 1000, because the antenna reflection calibration can only be executed with an accurate transmit power level, a transmit power calibration test may be performed, and must complete successfully to proceed. Once the transmit power calibration test completes successfully, in step 1005, a computing device (e.g., a personal computer or PC) operated within a test station for the production and calibration test may execute a command wherein the the test station RF switch connects an output select switch to a 50 Ohm load and an input select switch to a first antenna port for the RFID reader unit 110 (and ultimately for each antenna port). Next, in step 1010, the test station PC executes a command wherein the RFID reader 110 device under test (DUT) outputs a low power unmodulated signal on the first antenna port on the lowest calibration channels.

In step 1015, the test station PC then confirms that the output is present on the first antenna port, and executes a command, instructing the DUT to execute a reflection minimization algorithm. This algorithm first executes a coarse search through a subset of all possible values to 3 digitally adjustable capacitors in the reflection cancellation circuit wherein the step size through all possible values is greater than 1. At each permutation of capacitor values, the algorithm may measure the resulting reflection magnitude and compare it to the last minimum value. If the resulting reflection is less than the last minimum, then the last minimum value and corresponding capacitor values may be updated with the current permutation values.

After completion of the coarse grid search the minimum reflection setting for the tunable capacitor is known within the coarse grid. Thus, in step 1020, the algorithm may then execute a fine search through all possible values within a bounded range about the coarse grid minimum point. The step size through all possible values is 1. At each permutation of capacitor values the algorithm may measure the resulting reflection magnitude and compare it to the last minimum value. If the resulting reflection is less than the last minimum, then the last minimum value and corresponding capacitor values may be updated with permutation values. After completion of the fine grid search, in step 1025, the global minimum reflection setting for the tunable capacitor is known.

In step 1030, the tunable capacitor values at the global minimum at the given channel may then be stored in non-volatile memory for use in the field. These values represent the nominal cancellation setting when the DUT is connected to an ideal antenna which would present no reflection (i.e. a 50 Ohm load). In step 1035, the test station PC then executes one or more commands to the DUT to output a low power unmodulated signal on the next calibration channel, possibly the lowest calibration channel on the next port, and the algorithm returns to the beginning of the reflection minimization algorithm described above. In step 1040, if all calibration channels are exhausted then the algorithm proceeds. In other words, this process may be repeated for each antenna port for the RFID reader unit 110.

At this point all antenna ports and calibration channels have been calibrated to find the minimum reflection setting for the tunable capacitors in the reflection minimization circuit. This table of values is stored in non-volatile memory for use after deployment and/or installation. This phase of the production test routine is considered passing and the test station PC proceeds to the next test. Thus the results of the antenna reflection cancelation circuit testing may be stored in non-volatile memory, which may be accessible via the RFID reader unit 110 after deployment and installation.

Figure 11:
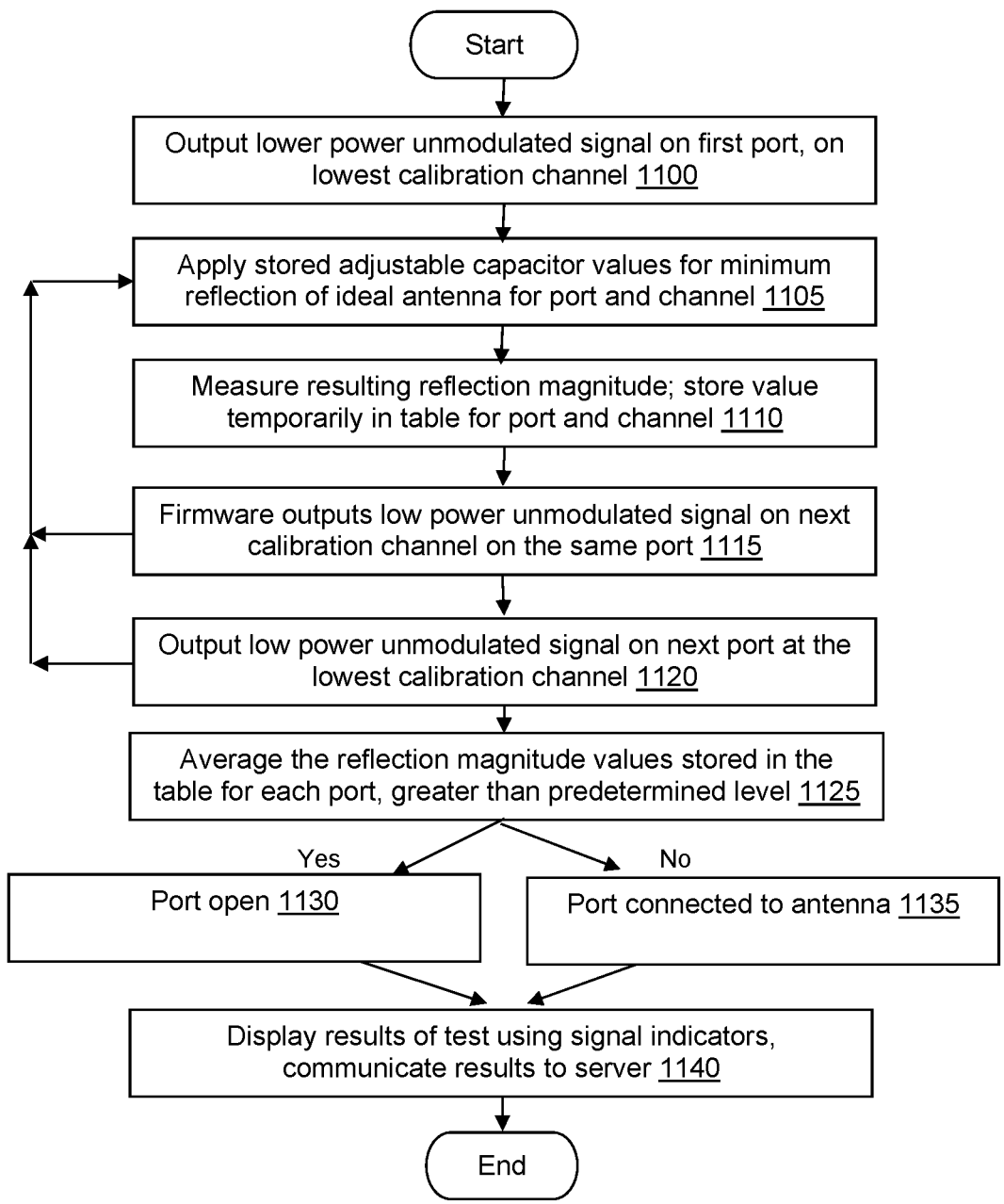
FIG. 11 illustrates a flow diagram for testing the antenna ports for attached antennas within an RFID reader within the integrated RFID system.

As seen in FIG. 11, once deployed and installed, each RFID reader unit 110 may execute an antenna auto detection at boot up. The antenna reflection cancelation circuit for each RFID reader unit 110 may be set to its calibrated nominal values on each antenna port within the RFID reader unit 110. A low power constant carrier transmit signal may be output on each of the antenna ports, and the resulting reflection may be measured and compared to an absolute limit which represents the amount of reflection in excess of an ideal perfect antenna.

Each RFID reader unit 110, as it first boots up, may perform a sequence of self-checks to verify that the hardware of the RFID reader unit 110 is in working order. It may then enter the antenna auto detection routine outlined in FIG. 11. In step 1100, the firmware in the RFID reader unit 110 configures the hardware to output a low power unmodulated signal on a first port on the lowest calibration channel. This "low power" is the same power level used in the production test calibration routine. In step 1105, the RFID reader 110 then looks up in non-volatile memory the stored adjustable capacitor values for minimum reflection for an ideal antenna for the given port and channel, and applies these settings to the adjustable capacitors.

In step 1110, the RFID reader 110 then measures the resulting reflection magnitude. It stores this value temporarily in a table for the given port and channel, and in step 1115, the associated firmware configures the hardware to output a low power unmodulated signal on the next calibration channel on the same port. The algorithm returns to the step of looking up the stored adjustable capacitor values for minimum reflection for an ideal antenna for the given port and channel and applying these settings to the adjustable capacitors. If all calibration channels are exhausted then the algorithm proceeds to step 1120.

In step 1120, the RFID reader unit 119 firmware then configures the hardware to output a low power unmodulated signal on the next port at the lowest calibration channel. The algorithm returns to the beginning of the step of looking up the stored adjustable capacitor values for minimum reflection for an ideal antenna for the given port and channel and applies these settings to the adjustable capacitors. If all ports are exhausted then the algorithm proceeds.

In step 1125, the RFID reader 110 then averages the reflection magnitude values stored in the table for each port. In step 1130, if the average value for each port is greater than a pre-determined level then the port is considered open. Otherwise, in step 1135, the port is considered connected to an antenna. Put another way, Antenna ports in excess of this absolute limit are considered "open" as they produce more reflection than would be expected from an antenna in a typical installation. By contrast, if an antenna is connected but not detected, the disclosed system may interpret this as an indication of a problem with the connectors or cables associated with the antenna, or with the antenna itself. If the antenna ports are not in excess of the absolute limit, and are connected and detected, the antenna may be considered properly calibrated, and will be used during subsequent tag inventories as described above.

As noted above, each RFID reader unit 110 may include hardware and/or logic enabling one or more customized LED signal indicators and/or audio notifications. In step 1140, these may be used to visually or otherwise display the result of the auto detection algorithm after execution. These results may further be communicated to server 115. The methods identified above may aid in identifying issues quickly with external antenna installation without explicitly enabling or configuring each reader's antenna port. Thus, the RFID reader 110 outputs the results of the auto detection through a sequence of blinks on the device LEDs and sends the status to the application server. The reader now proceeds to normal operation and will iterate through the connected ports during each tag inventory round.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
 a Radio Frequency Identification (RFID) tag affixed to an asset;
 a database coupled to a network and storing, in association, a unique identifier for the RFID tag, and the asset;
 a server hardware computing device coupled to the network and comprising at least one processor executing specific computer-executable instructions;
 an RFID reader coupled to the network and comprising at least one processor executing specific computer-executable firmware instructions that, when executed, cause the RFID reader to:
  decode, from a transmission received from the server hardware computing device, a customizable software comprising a programmable logic to be executed by the at least one RFID reader;
  recognize the RFID tag according to a signal strength of the RFID tag;
  determine, according to the signal strength and a tag state machine within the customizable software, a tag state for the RFID tag;
  responsive to the tag state for the RFID tag changing from a previous tag state, transmit a publication of the tag state to the server hardware computing device.

2. The system of claim 1, wherein the RFID reader is one of a plurality of readers installed within an identified location.

3. The system of claim 1, wherein the tag state machine determines the tag state of the RFID tag according to a number of received data points indicating the signal strength of the RFID tag.

4. The system of claim 1, wherein the RFID reader includes an internal database configured to store the tag state of the RFID tag.

5. The system of claim 1, wherein the computer-executable firmware instructions define a conditional behavior for the RFID reader responsive to receiving a programmable profile or parameter for the conditional behavior.

6. The system of claim 1, wherein the computer-executable firmware instructions cause the RFID reader to generate a visual or audio notification responsive to the RFID reader recognizing the RFID tag.

7. The system of claim 5, wherein the specific computer-executable instructions generate a graphical user interface (GUI), displayed on a client hardware computing device coupled to the network and receiving user input defining the profile or parameter.

8. The system of claim 5, wherein the specific computer-executable instructions generate a graphical user interface (GUI), displayed on a client hardware computing device coupled to the network and displaying a location of the asset associated with the RFID tag.

9. The system of claim 1, wherein the RFID reader is an Internet of Things device coupled to the server hardware computing device through a low bandwidth solution comprising MATT, Wi-Fi, or LoRa.

10. The system of claim 1, wherein:
 prior to installation of the RFID reader, an antenna reflection cancellation circuit for at least one antenna port within the RFID reader is calibrated to a nominal setting and stored in a non-volatile memory; and
 on installation of the RFID reader
  an antenna auto-detection is executed; and
  the antenna reflection cancellation circuit of the at least one antenna port is measured and compared to an absolute limit representing an amount of reflection in excess of an ideal antenna.

11. A method, comprising:
 executing, by an Radio Frequency Identification (RFID) reader coupled to a network and comprising at least one processor, specific computer-executable firmware instructions;
 decoding, by the RFID reader, a transmission received from the at least one server hardware computing device coupled to the network and comprising at least one processor executing specific computer-executable instructions, the transmission comprising a customizable software comprising a programmable logic to be executed by the RFID reader;
 recognizing, by the RFID reader, a signal strength of an RFID tag affixed to an asset;
 determining, by the RFID reader and according to the signal strength and a tag state machine within the customizable software, a tag state for the RFID tag;
 responsive to the tag state for the RFID tag changing from a previous tag state, transmitting, by the RFID reader, a publication of the tag state to the server hardware computing device.

12. The method of claim 11, wherein the RFID reader is one of a plurality of readers installed within an identified location.

13. The method of claim 11, wherein the tag state machine determines the tag state of the RFID tag according to a number of received data points indicating the signal strength of the RFID tag.

14. The method of claim 11, wherein the RFID reader includes an internal database configured to store the tag state of the RFID tag.

15. The method of claim 11, further comprising the step of defining a conditional behavior for the RFID reader responsive to receiving a programmable profile or parameter for the conditional behavior.

16. The method of claim 11, further comprising the step of generating a visual or audio notification responsive to the RFID reader recognizing the RFID tag.

17. The method of claim 15, further comprising the step of generating a graphical user interface (GUI), displayed on a client hardware computing device coupled to the network and receiving user input defining the profile or parameter.

18. The method of claim 15, further comprising the step of generating a graphical user interface (GUI), displayed on a client hardware computing device coupled to the network and displaying a location of the asset associated with the RFID tag.

19. The method of claim 11, wherein the RFID reader is an Internet of Things device coupled to the server hardware computing device through a low bandwidth solution comprising MATT, Wi-Fi, or LoRa.

20. The method of claim 11, wherein:
prior to installation of the RFID reader, an antenna reflection cancellation circuit for at least one antenna port within the RFID reader is calibrated to a nominal setting and stored in a non-volatile memory; and
on installation of the RFID reader
an antenna auto-detection is executed; and
the antenna reflection cancellation circuit of the at least one antenna port is measured and compared to an absolute limit representing an amount of reflection in excess of an ideal antenna.

* * * * *

UNITED STATES PATENT AND TRADEMARK OFFICE
CERTIFICATE OF CORRECTION

PATENT NO. : 10,726,214 B2
APPLICATION NO. : 16/491934
DATED : July 28, 2020
INVENTOR(S) : Alex C. Rein et al.

Page 1 of 1

It is certified that error appears in the above-identified patent and that said Letters Patent is hereby corrected as shown below:

In the Claims

Column 18, Claim 9, Line 30, "MATT" should be MQTT.

Signed and Sealed this
Twenty-seventh Day of October, 2020

Andrei Iancu
*Director of the United States Patent and Trademark Office*